G. E. Van Amringe.

Tube for Steam Generator.

No. 3,346. Reissued Mar. 30, 1869.

Witnesses:

A. W. Almquist

E. L. Topliff

Inventor:

Geo. E. Van Amringe per M. W. Mc C.

Attorney

UNITED STATES PATENT OFFICE.

G. E. VAN AMRINGE, OF NEW YORK, N. Y.

IMPROVEMENT IN TUBES FOR STEAM-GENERATORS.

Specification forming part of Letters Patent No. 85,149, dated December 22, 1868; Reissue No. 3,346, dated March 30, 1869.

*To all whom it may concern:*

Be it known that I, GEORGE E. VAN AMRINGE, of the city, county, and State of New York, have invented a new and useful Improvement in the Tubes of Steam-Boilers; and I do hereby declare that the following is a full, clear, and exact description thereof, which will enable others skilled in the art to make and use the same, reference being had to the accompanying drawings, forming part of this specification, in which—

Figure 1:
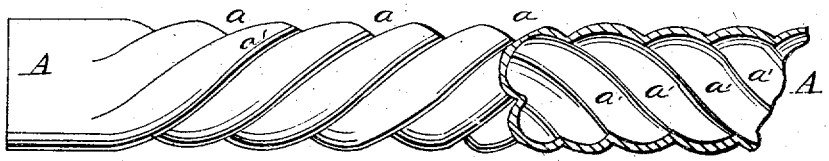
Figure 2:
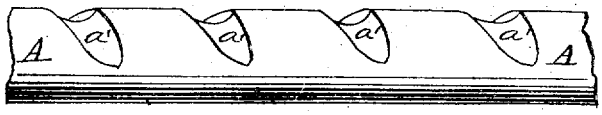

Figure 1 is a side view, partly in section, of a portion of a steam-boiler tube illustrating my invention. Fig. 2 illustrates a modification of the same.

Similar letters of reference indicate corresponding parts.

My invention has for its object to improve the construction of the tubes of steam-boilers so as to economize the heat, or, in other words, to obtain a greater practical effect from the same amount of fuel than when the tubes are constructed in the ordinary manner, and it consists in the construction of the tubes with spiral or transverse corrugations extending wholly or partially around said tubes, as hereinafter more fully described.

A represents a tube of a steam-generator, which is corrugated spirally, as shown in Fig. 1. The corrugations $a'$ may extend entirely around the tube, as shown in Fig. 1, or they may be formed only upon part of said tube, as shown in red in Fig. 2. The corrugations $a'$ may be formed at any desired angle with the axis of the tube or they may be formed at right angles with said axis.

By this construction, as the flame, smoke, or other products of combustion pass through the tube A, they impinge upon the inwardly-projecting surfaces of the corrugations $a'$ and receive a waving or swirling motion, the effect of which is to cause all the particles of said products of combustion to come into immediate and frequent contact with the inner surface of the tube A, so that a much larger amount of heat is abstracted from said products of combustion and communicated to the water surrounding the tube, thus producing a much greater practical effect than is possible when the products of combustion pass through a smooth straight tube.

This invention is equally applicable to all varieties of tubular steam-boilers, whether locomotive, stationary, or marine.

I am aware of the patents of B. J. Miller, April 5, 1838, Richard Montgomery, October 29, 1850, and March 9, 1867, and to James H. Sturdy, January 15, 1867, and I do not therefore claim what is therein claimed; but

What I claim as new, and desire to secure by Letters Patent, is—

The construction of tubes of steam-generators, substantially as herein set forth.

G. E. VAN AMRINGE.

Witnesses:

FRANK BLOCKLEY,

JAMES T. GRAHAM.